(12) United States Patent
Hokkirigawa et al.

(10) Patent No.: US 6,777,360 B2
(45) Date of Patent: Aug. 17, 2004

(54) CERAMIC MATERIAL, METHOD OF PRODUCING SAME, AND FORMED PRODUCT THEREOF

(75) Inventors: Kazuo Hokkirigawa, Yonezawa (JP); Rikuro Obara, Nagano-ken (JP); Motoharu Akiyama, Nagano-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 56 days.

(21) Appl. No.: 10/073,753

(22) Filed: Feb. 11, 2002

(65) Prior Publication Data

US 2002/0155941 A1 Oct. 24, 2002

(30) Foreign Application Priority Data

Feb. 13, 2001 (JP) ........................................ 2001-034751

(51) Int. Cl.[7] ........................ C04B 35/52; C04B 35/532
(52) U.S. Cl. ........................ 501/87; 501/88; 501/96.4; 501/97.1; 501/98.1; 501/103; 501/127; 501/133; 501/141; 501/155; 264/29.1; 264/29.5; 264/29.6; 264/653; 264/657; 264/663; 264/665; 264/666; 264/676; 264/681; 264/682; 264/683
(58) Field of Search ............................ 501/87, 88, 96.4, 501/97.1, 98.1, 103, 127, 133, 141, 155; 264/29.1, 29.5, 29.6, 653, 657, 663, 665, 666, 676, 681, 682, 683

(56) References Cited

U.S. PATENT DOCUMENTS

| | | | |
|---|---|---|---|
| 4,981,665 A | | 1/1991 | Boecker et al. |
| 4,987,104 A | * | 1/1991 | Trigg ........................... 501/92 |
| 5,916,499 A | | 6/1999 | Murayama et al. |
| 6,444,186 B1 | * | 9/2002 | Vempati ..................... 423/335 |

FOREIGN PATENT DOCUMENTS

| | | |
|---|---|---|
| DE | 42 42 610 | 7/1993 |
| DE | 197 31 653 A | 7/1997 |
| GB | 632 247 | 11/1949 |
| GB | 2 245 558 | 1/1992 |
| WO | WO 94/03410 | 2/1994 |

OTHER PUBLICATIONS

Development of Hard and Porous Carbon Material "RB Ceramics" Using Rice Bran as a Starting Material, by Kazuo Hokkirigawa, Assistant Professor, Department of Mechanical System Engineering, Faculty of Engineering, Yamagata University, Translation from "Zairyou Kaguku", vol. 17, No. 6, pp. 24 to 27, May 1997.

Development of Hard and Porous Carbon Material "RB Ceramics" Using Rice Bran as a Starting Material, Translation from "Zairyou Kagaku", vol. 17, No. 6, pp 24–27, May 1997.

* cited by examiner

Primary Examiner—Paul Marcantoni
(74) Attorney, Agent, or Firm—Flynn, Thiel, Boutell & Tanis, P.C.

(57) ABSTRACT

A ceramic material suitable for use in production of paving tiles, construction tiles, flooring in offices, flooring in machinery plants and so forth is obtained by a method comprising steps of mixing defatted bran derived from rice bran with a thermosetting resin before kneading, subjecting a kneaded mixture thus obtained to a primary firing in an inert gas at a temperature in a range of 700 to 1000° C., pulverizing the kneaded mixture after the primary firing into carbonized powders, kneading the carbonized powders with which ceramic powders, a solvent, and a binder as desired are mixed into a plastic workpiece (kneaded mass), pressure-forming the plastic workpiece at pressure in a range of 10 to 100 MPa, and subjecting a formed plastic workpiece thus obtained again to firing in an inert gas atmosphere at a temperature in a range of 100 to 1400° C.

6 Claims, No Drawings

CERAMIC MATERIAL, METHOD OF PRODUCING SAME, AND FORMED PRODUCT THEREOF

BACKGROUND OF THE INVENTION

1. Field of the Invention

The invention relates to ceramic material suitable for use in production of paving tiles, construction tiles, flooring in offices, flooring in machinery plants and so forth, and more particularly, to a ceramic material obtained by a method comprising steps of mixing defatted bran derived from rice bran with a thermosetting resin before kneading, subjecting a kneaded mixture thus obtained to a primary firing in an inert gas at a temperature in a range of 700 to 1000° C., pulverizing the kneaded mixture after the primary firing into carbonized powders, kneading the carbonized powders with which ceramic powders, a solvent, and a binder as desired are mixed into a plastic workpiece (kneaded mass), pressure-forming the plastic workpiece at pressure in a range of 10 to 100 MPa, and subjecting a formed plastic workpiece thus obtained again to firing in an inert gas atmosphere at a temperature in a range of 100 to 1400° C.

2. Description of the Related Art

In the past, porcelain clay, feldspathic clay, and silica-alumina based ceramic powders have been in widespread use for production of paving tiles, and construction tiles. Synthetic resin as represented by vinyl chloride has been in use for flooring in offices and machinery plants. However, conventional tiles have been slippery because of the hard surface thereof while flooring in offices, made of synthetic resin, have had insulating property, and been prone to generation of static electricity, so that there have been involved risks of the flooring not only giving discomfort but also causing the erroneous operation of a computer and the like. In addition, there has been a possibility of oil dropping on the floor in plants such as a machinery plant, causing workers to slip and fall on the floor. This has posed operational problems.

Meanwhile, an attempt to obtain a porous carbonaceous material by utilizing rice bran, produced in quantity of 900,000 tons a year in Japan and in as much as 33 million tons a year throughout the world, has been well known by researches carried out by Mr. Kazuo Hokkirigawa, the first inventor of the present invention (refer to "Functional Material", May issue, 1997, Vol. 17, No. 5, pp. 24~28).

Herein are disclosed a carbonaceous material obtained by mixing defatted bran derived from rice bran with a thermosetting resin before kneading, drying a formed kneaded mixture obtained by pressure-forming a kneaded mixture, and subsequently, firing the formed kneaded mixture as dried in an inert gas, and a method of producing the carbonaceous material.

With such a method as described above, however, it has been practically difficult to form the formed kneaded mixture with precision because there occurs discrepancy in dimensions by as much as 25% in terms of a contraction ratio of the dimensions of the formed kneaded mixture prepared by the step of pressure-forming to those of a finished formed product obtained after the step of firing in the inert gas.

It is therefore an object of the invention to provide a ceramic material having such properties as a small contraction ratio of the dimensions of a formed ceramic workpiece to those of a finished product, excellent electric conductivity, small thermal strain, insusceptibility to damage, tendency of an increase in friction resistance when wet, light weight, a long service life, and ability to absorb oil and grease with ease, providing at the same time a high-tech eco-material (state-of-the-art material excellent in ecological adaptability) capable of utilizing biomass resources, which is different from the conventional industrial material.

The inventor of the present invention has found out that the ceramic material having the properties as described above can be obtained, and succeeded in development of the invention. That is, there has been developed a ceramic material having excellent properties required of ceramic material, including a small contraction ratio in the dimensions of a formed ceramic workpiece to those of a finished product, suitable for use in production of paving tiles, construction tiles, flooring in offices, flooring in machinery plants and so forth.

SUMMARY OF THE INVENTION

The inventor of the present invention has conducted intense studies, and found out that a ceramic material is obtained by a method comprising steps of mixing defatted bran derived from rice bran with a thermosetting resin before kneading, subjecting a kneaded mixture thus obtained to a primary firing in an inert gas at a temperature in a range of 700 to 1000° C., pulverizing the kneaded mixture after the primary firing into carbonized powders, kneading the carbonized powders with which ceramic powders, a solvent, and a binder as desired are mixed into a plastic workpiece (kneaded mass), pressure-forming the plastic workpiece at pressure in a range of 10 to 100 NPa, and subjecting a formed plastic workpiece thus obtained again to firing in an inert gas atmosphere at a temperature in a range of 100 to 1400° C.

More specifically, it has been possible to obtain the ceramic material described above having high compressive strength, a small contraction ratio of the dimensions of a formed ceramic workpiece to those of a finished product, which is 3% or less, 13 wt % of oil absorption ratio, low volume resistivity, and low density with Vickers hardness not less than 300 to 600.

DESCRIPTION OF THE PREFERRED EMBODIMENTS

Defatted bran derived from rice bran, used in carrying out the present invention, may be of either local origin or foreign origin regardless of the kind of rice.

Further, any thermosetting resin may be used as long as it has thermosetting property, and typical examples thereof include phenol resin, diaryl phthalate resin, unsaturated polyester resin, epoxy resin, polyimide resin, and triazine resin. In particular, phenol resin is preferably used.

Furthermore, a thermoplastic resin such as a polyamide, and so forth can be used in combination with a thermosetting resin provided that it is used without departing from the spirit and scope of the invention.

Ceramic powders to be mixed with carbonized powders in carrying out the invention are composed of any selected from the group consisting of $SiO_2$, $Si_3N_4$, $ZrO_2$, $Al_2O_3$, SiC, BN, WC, TiC, Sialon (Si—Al—O—N based compound solid solution), porcelain clay, feldspathic clay, kaolinite, and so forth.

In the present invention, one kind or not less than two kinds of such ceramic powders as described above may be used.

Ceramic powders not more than 50 $\mu$m in grain size are desirable, and those not more than 20 $\mu$m in grain size are preferable, those in a range of 0.3 to 3 $\mu$m in grain size being more preferably used.

Ceramic powder material as desired can be obtained by mixing the carbonized powders with the ceramic powders not more than 50 $\mu$m in grain size.

The carbonized powders can be well mixed with the ceramic powders at a ratio of 5 to 95:95 to 5 by weight.

A mixing ratio of the defatted bran to a thermosetting resin is 50 to 90:50 to 10 by weight, however, the mixing ratio of 75:25 is preferably adopted.

A thermosetting resin in a liquid state, having a relatively small molecular weight, is desirable for use in this case.

A primary firing is performed at a temperature in a range of 700 to 1000° C., using normally a rotary kiln, and a firing time is for a duration in a range of 40 to 120 min.

The carbonized powders after the primary firing can be mixed with the ceramic powders at a mixing ratio of the former to the latter of 5 to 95:95 to 5 by weight, however, if a ratio of the carbonized powders exceeds 95% by weight, the stability of the surface hardness of a formed ceramic product as obtained deteriorates while if the ratio thereof is not more than 5% by weight, electric conductivity of the formed ceramic product deteriorates.

A binder used in carrying out the present invention is broadly classified into an organic one and an inorganic one.

Examples of the organic binder are paraffin binders such as polyvinyl alcohol, polyvinyl butyral, polyethylene glycol, methyl cellulose, ethyl cellulose and so forth.

Further, examples of a resin binder material among organic binder materials are phenol resin, polyethylene resin, vinyl acetate resin, epoxy resin, melamine resin, styrol resin, plyacetal resin, polyester resin, polypropylene resin, vinyl chloride resin, acrylic resin, polyamide resin, urethane resin and so forth.

Furthermore, examples of a wax binder material among the organic binder materials are paraffin wax, microcrystalline wax, Fischer Tropsch wax, polyethylene wax, deformed wax, atactic polypropylene.

Examples of an inorganic binder material among inorganic binder materials used in the binder according to the invention include a phosphoric acid based binder material such as phosphoric acid, aluminum phosphate, pyrophosphoric acid, and trypolyphosphoric acid and a silicon based binder material such as soda silicate, kairome clay (a kind of kaolinite clay). Examples of a titanium based binder material include titania sol.

An amount of the binder to be added represents 1 to 50 parts by weight, preferably, 5 to 20 parts by weight against 100 parts by weight of the carbonized powders combined with the ceramic powders.

A solvent is added such that a plastic workpiece having hardness as desired is obtained by mixing the solvent with the carbonized powders, the ceramic powders, and the binder before kneading. An amount of the solvent to be added represents 5 to 20 parts by weight, preferably, 8 to 15 parts by weight against 100 parts by weight of the carbonized powders combined with the ceramic powders.

Examples of the solvents used in the present invention are water, alcohol such as methanol, ethanol, and propanol, ketone such as acetone, and ethyl methyl ketone, ester, toluene, xylene, Cellosolve, and so forth.

The kneaded mixture of the carbonized powders and the thermosetting resin after the primary firing is pressure-formed at a pressure in a range of 10 to 100 MPa, preferably in a range of 25 to 50 MPa. A die used is preferably at a temperature of about 150° C.

A heat treatment is performed at a temperature in a range of 100 to 1400° C., and heat treatment time is in a range of about 60 to 120 min.

A warming rate up to a firing temperature is required to be relatively moderate up to 500° C. In terms of more specific values, the warming rate is in a range of 0.5 to 3° C./min, and is preferably 1° C./min.

Further, in lowering the temperature of the kneaded mixture after it is baked, a relatively moderate cooling rate is required until reaching 500° C. In terms of more specific values, a cooling rate is in a range of 0.5 to 4° C./min, and is preferably 1 to 2° C. min. Upon the temperature dropping below 500° C., the kneaded mixture is left to cool by itself.

Further, an inert gas atmosphere according to the invention means an atmosphere containing no oxygen which is an active gas, referring to a space vacuumized to a degree or a space filled up with an inert gas. Any gas selected from the group consisting of helium, argon, neon, and nitrogen gas may be used in carrying out the present invention, however, nitrogen gas is preferably used.

Now, the embodiments of the invention are summed up as follows:

(1) a ceramic material obtained by a method comprising steps of mixing defatted bran derived from rice bran with a thermosetting resin before kneading, subjecting a kneaded mixture thus obtained to a primary firing in an inert gas at a temperature in a range of 700 to 1000° C., pulverizing the kneaded mixture after the primary firing into carbonized powders, kneading the carbonized powders with which ceramic powders, a solvent, and a binder as desired are mixed into a plastic workpiece (kneaded mass), pressure-forming the plastic workpiece at pressure in a range of 10 to 100 MPa, and subjecting a formed plastic workpiece thus obtained again to firing in an inert gas atmosphere at a temperature in a range of 100 to 1400° C.

(2) a ceramic material described under item (1) above wherein the ceramic powders are one kind of, or not less than two kinds of ceramic powders composed of any selected from the group consisting of $SiO_2$, $Si_3N_4$, $ZrO_2$, $Al_2O_3$, SiC, BN, WC, TiC, Sialon (Si—Al—O—N based compound solid solution), porcelain clay, feldspathic clay, and kaolinite.

(3) a ceramic material described under item (1) or (2) above wherein the thermosetting resin is one kind of, or not less than two kinds of resins selected from the group consisting of phenol resin, diaryl phthalate resin, unsaturated polyester resin, epoxy resin, polyimide resin, and triazine resin;

(4) a ceramic material described under any one of items (1) to (3) above wherein the binder is an organic binder and/or an inorganic binder, and an amount of the binder to be added represents 1 to 50 parts by weight against 100 parts by weight of the carbonized powders combined with the ceramic powders.

(5) a ceramic material described under any one of items (1) to (4) above wherein a mixing ratio of the defatted bran to the thermosetting resin is 50 to 90:50 to 10 by weight.

(6) a ceramic material described under any one of items (1) to (5) above wherein a mixing ratio of the carbonized powders to the ceramic powders is 5 to 95:95 to 5 by weight.

(7) a ceramic material described under any one of items (1) to (6) above wherein a grain size of the carbonized powders is in a range of 10 to 500 $\mu$m.

(8) a formed sintered tile, wherein the ceramic material described under any one of items (1) to (7) above is formed in the shape of a square or rectangular sheet.

(9) a formed sintered flooring, wherein the ceramic material described under any one of items (1) to (7) above is formed in the shape of a square or rectangular sheet.

EXAMPLES

The invention is described in more detail hereinafter on the basis of the following examples.

Examples 1 to 7 are described hereinafter with reference to a method of fabricating the formed sintered tile in the shape of a square or rectangular sheet, formed of the ceramic material.

A plastic and homogeneous mixture was obtained by mixing 55 to 75 g of defatted bran derived from rice bran with 15 to 45 g of phenol resin in a liquid state (resol) before kneading while heating at a temperature in a range of 50 to 60° C.

The mixture was baked in a nitrogen atmosphere at a temperature in a range of 800 to 1000° C. by use of a rotary kiln for a duration of 60 to 70 min. A carbonized baked mixture thus obtained was pulverized by use of a crusher, and screened through a 50-mesh sieve, thereby obtaining carbonized powders 10 to 500 μm in grain size.

A plastic and homogeneous mixture was obtained by mixing 25 to 70 g of the carbonized powders thus obtained with 30 to 70 g of one kind or two kinds of ceramic powders, 0 to 60 g of a binder, and 10 to 30 g of a solvent before kneading.

In the examples, use was made of silica 5 to 10 μm in grain size, and alumina 10 to 20 μm in grain size, respectively.

Further, the binder used in the examples was composed of any selected from the group consisting of commercially available phenol resin, commercially available polyvinyl alcohol in powder form, and poly vinyl acetate. As an inorganic binder material, use was made of soda silicate and aluminum phosphate.

Subsequently, the plastic mixture was pressure-formed at pressure in a range of 10 to 80 MPa. A die used was at 150° C.

A formed workpiece was taken out of the die, heated in an nitrogen atmosphere at a warming rate of 1° C./min. up to 500° C., held at 500° C. for a duration of 60 min., and sintered at a temperature in a range of 1000 to 1400° C. for a duration of 100 to 130 min.

Subsequently, a sintered product was cooled at a cooling rate in a range of 2 to 3° C./min. until a temperature reached 500° C., and upon the temperature dropping below 500° C., the sintered product was left to cool by itself.

Table 1 shows the conditions for a method of producing ceramic materials.

TABLE 1

|  | ex. 1 | ex. 2 | ex. 3 | ex. 4 | ex. 5 | ex. 6 | ex. 7 | conv. ex. |
|---|---|---|---|---|---|---|---|---|
| mix. amt. (g) | | | | | | | | |
| degr'd bran | 75 | 75 | 75 | 80 | 60 | 55 | 85 | 75 |
| t-sett. resin | 25 | 25 | 25 | 20 | 40 | 45 | 15 | 25 |
| prim. firing (° C.) | 900 | 900 | 900 | 850 | 1000 | 1000 | 800 | — |
| time (min) | 60 | 60 | 60 | 60 | 70 | 70 | 60 | |
| aver. grain size (μm) | 100 | 90 | 100 | 40 | 120 | 50 | 130 | — |
| mix. amt. (g) | | | | | | | | — |
| c. pow-der ce'mic | 60 | 80 | 50 | 70 | 100 | 70 | 90 | |
| SiO2 | 25 | | 40 | | | 10 | 20 | |
| Al2O3 | 25 | 60 | 20 | 10 | | 20 | 20 | |
| porcelain clay | | | | 40 | 45 | | 15 | |
| binder | | | | | | | | — |
| phenol resin | | | 50 | | | | | |
| PVA | 10 | | | | | 10 | 5 | |
| PVAC | | | | 10 | | | 15 | |
| soda silica. | | 10 | | 5 | | 5 | | |
| Al phos. | | | | 5 | | | | |
| solvent (g) | | | | | | | | — |
| water | 20 | 25 | 15 | 10 | 30 | 15 | 15 | |
| eth'nol | | | 5 | | | 5 | 15 | |
| form. press. (MPa) | 25 | 20 | 50 | 15 | 10 | 80 | 50 | 23.5 |
| heat treat. (° C.) | 1000 | 1100 | 150 | 1050 | 1200 | 1150 | 1300 | 900 |
| firing time (min.) | 120 | 100 | 600 | 120 | 100 | 100 | 120 | 120 |
| warm. rate | 1.5 | 2.0 | | 2.0 | 1.5 | 2.5 | 2.0 | 1 |
| cool. rate | 2.0 | 2.0 | left to cool | 2.0 | 2.5 | 2.5 | 2.5 | 2 |
| atm. | nito-gen | nito-gen | nito-gen | nito-gen | nito-gen | nito-gen | nito-gen | nito-gen | abbreviation:
ex. 1 = example 1; conv. ex. = conventional example; mix. amt. = mixed amount; degr'd. bran = defatted bran; t-sett. resin = thermosetting resin; c. pow-der = carbonized powders; sil. c'rbide - solicon carbide, form. press. = forming pressure; heat treat. = heat treatment; warm. rate = warming rate; and cool. rate = cooling rate. "left to cool" means "left to cool by itself"; PVA = polyvinyl alcohol; PVAC = poly vinyl acetate; soda silica. = soda silicate; eth'nol = ethanol; and Al phos. = aluminum phosphate.

Table 2 shows properties of formed products composed of various ceramic materials.

TABLE 2

|  | ex. 1 | ex. 2 | ex. 3 | ex. 4 | ex. 5 | ex. 6 | ex. 7 | conv. ex. |
| --- | --- | --- | --- | --- | --- | --- | --- | --- |
| d. c. ratio (%) | 2.0 | 2.0 | 2.5 | 1.9 | 1.0 | 1.8 | 1.9 | 2.5 |
| c. s. (MPa) | 180 | 220 | 130 | 200 | 180 | 210 | 240 | 60 |
| oil abs. (wt %) | 8.1 | 7.2 | 2.6 | 7.2 | 9.5 | 9.5 | 8.1 | 13.5 |
| vol. res'st. ($10^3$ Ω cm) | 8.2 | 9.2 | 2.5 | 9.2 | 7.0 | 7.0 | 8.2 | 4.9 |
| fr'ctn coeff. ($\mu$) | 0.25 | 0.26 | 0.33 | 0.21 | 0.19 | 0.17 | 0.16 | 0.19 |
| hyg'o scop. (wt %) | 2.6 | 1.8 | 1.7 | 2.1 | 2.2 | 1.9 | 2.0 | 2.9 |
| Hv | 450 | 500 | 280 | 380 | 550 | 320 | 310 | 250 | abbreviation:
d. c. ratio = dimensional contraction ratio; conv. ex. = conventional example; c. s. = compressive strength; oil abs. = oil absorption ratio; vol. res'st = volume resistivity; fr'ctn coeff. = friction coefficient; and hyg'oscop. = hygroscopicity; Hv = Vickers hardness Compressive strength was measured by conducting tests on test-pieces in a columnar shape of 5 mm (diameter)×12.5 mm (height). Oil absorption ratio is indicated by a ratio of the weight of lubricating oil to that of the test-piece as measured by means of centrifugal separation of the lubricating oil at 1150 rpm for 45 seconds from the test-piece impregnated with the deaerated lubricating oil.

Hygroscopicity was measured by heating the test-pieces at 150° C. for 6 hours, and treating the same in a vacuum desiccator for 20 hours before leaving the same in a room kept at room temperature for 72 hours.

Friction coefficient tests on the materials of the examples were conducted. Friction coefficient was found by means of a SRV tester by 1 mm stroke at room temperature, using a steel ball 10 mm in diameter, and applying a load of ION and 50N, respectively.

Also, Vickers hardness tests on the materials of the examples were conducted. Vickers hardness Hv was measured by use of a Vickers hardness meter.

Conventional Example

A mixture obtained by mixing 75 g of defatted bran derived from rice bran with 5 g of water, and 25 g of phenol resin (resol) in a liquid state was kneaded and dried. Subsequently, a plastic mixture thus obtained was pressure-formed into the shape of a rolling element at pressure of 21.5 APa. A die used was at a temperature of 150° C.

A formed workpiece was taken out of the die, heated in a nitrogen atmosphere at a warming rate of 1° C./min. up to 500° C., and sintered at 900° C. for a duration of about 120 min.

Subsequently, the temperature of a formed product was lowered down to 500° C. at a cooling rate in a range of 2 to 3° C./min., and upon the temperature dropping below 500° C., the formed product was left to cool by itself. Table 2 shows properties thereof.

Thus, it has been confirmed that the ceramic material according to the invention has properties suitable for use in flooring, not observed of conventional material, such as high compressive strength, excellent electrical conductivity, small thermal strain, insusceptibility to damage, light weight, a long service life, and ability to absorb oil.

What is claimed is:

1. A ceramic material obtained by a method comprising the steps of:

mixing a defatted bran derived from rice bran with at least one thermosetting resin selected from the group consisting of a phenol resin, diaryl phthalate resin, unsaturated polyester resin, epoxy resin, polyimide resin and triazine resin at a mixing ratio of the defatted bran to the thermosetting resin of 50 to 90:50 to 10 by weight to form a mixture;

kneading the mixture;

subjecting the kneaded mixture to a primary firing in an inert gas at a temperature in the range of 700 to 1000° C.;

pulverizing the kneaded mixture after the primary firing into carbonized powders;

kneading the carbonated powders with ceramic powders, a solvent and a binder to yield a plastic workpiece;

pressure-forming the plastic workpiece at a pressure in the range of 10 to 100 MPa to give a formed plastic workpiece; and subjecting the formed plastic workpiece to secondary firing in an inert gas atmosphere or in an atmosphere having no oxygen at a temperature in a range of 100 to 1400° C., wherein the ceramic powders are selected from the group consisting of $SiO_2$, $Si_3N_4$, $ZrO_2$, $Al_2O_3$, SiC, BN, WC, TiC, a Sialon compound, porcelain clay, feldspathic clay and kaolinite, wherein the mixing ratio of the carbonized powders to the ceramic powders is 5 to 95:95 to 5 by weight and the binder is added in an amount of 1 to 50 parts by weight, based on 100 parts by weight of the carbonized powders.

2. The ceramic material according to claim 1, wherein the grain size of the carbonized powders is in the range of 10 to 500 $\mu$m.

3. The ceramic material according to claim 1, wherein the plastic workpiece is pressure-formed into a tile in the shape of a square or rectangular sheet.

4. The ceramic material according to claim 1, wherein the plastic workpiece is pressure-formed into the shape of a square or rectangular sheet.

5. A method of fabricating a ceramic material comprising the steps of:

mixing a defatted bran derived from rice bran with at least one thermosetting resin selected from the group consisting of a phenol resin, diaryl phthalate resin, unsaturated polyester resin, epoxy resin, polyamide resin and triazine resin at a mixing ratio of the defatted bran to the thermosetting resin of 50 to 90:50 to 10 by weight to form a mixture;

kneading the mixture;

subjecting the kneaded mixture to a primary firing in an inert gas at a temperature in the range of 700 to 1000° C.; pulverizing the kneaded mixture after the primary firing into carbonized powders;

kneading the carbonized powders with ceramic powders, a solvent and a binder to yield a plastic workpiece;

pressure-forming the plastic workpiece at a pressure in the range of 10 to 100 MPa to give a formed plastic workpiece; and subjecting the formed plastic workpiece to secondary firing in an inert gas atmosphere or in an atmosphere having no oxygen at a temperature in a range of 100 to 1400° C., wherein the ceramic powders are selected from the group consisting of $SiO_2$, $Si_3N_4$, $ZrO_2$, $Al_2O_3$, SiC, BN, WC, TiC, a Sialon compound, porcelain clay, feldspathic clay, kaolinite, wherein the mixing ratio of the carbonized powders to the ceramic powders is 5 to 95:95 to 5 by weight and the binder is added in an amount of 1 to 50 parts by weight, based on 100 parts by weight of the carbonized powders.

6. The method of claim 5, wherein the formed plastic workpiece is subjected to the secondary firing at a temperature in the range of 1000 to 1400° C. at a warming rate of 0.5 to 3° C./min to a temperature of 500° C. and cooled at a rate of 0.5 to 4° C./min until reaching a temperature of 500° C.

* * * * *